UNITED STATES PATENT OFFICE.

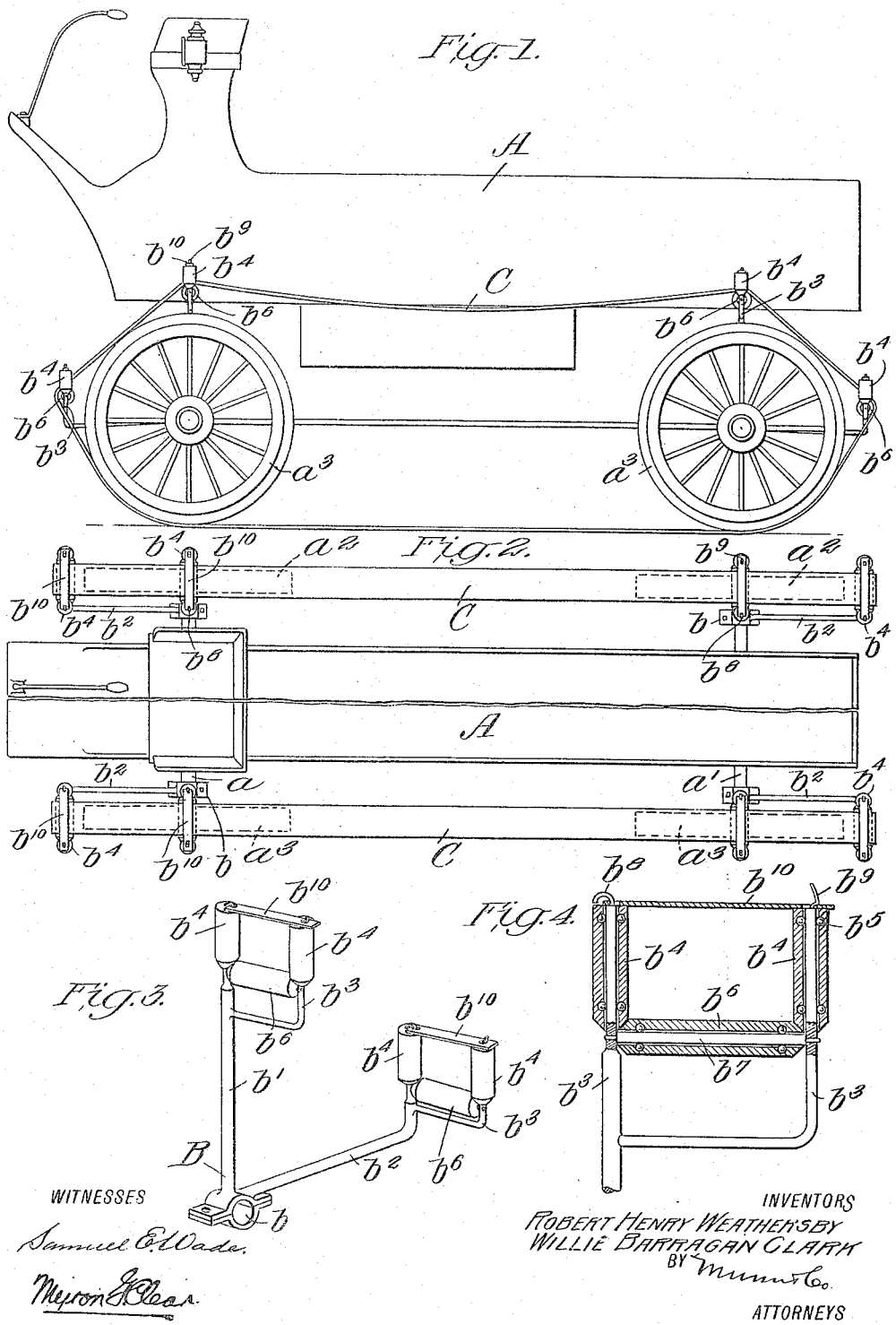

ROBERT H. WEATHERSBY AND WILLIE B. CLARK, OF MAMMOTH, ARIZONA.

BELT-GUIDING DEVICE.

1,135,744. Specification of Letters Patent. Patented Apr. 13, 1915.

Application filed February 6, 1913. Serial No. 746,509.

*To all whom it may concern:*

Be it known that we, ROBERT H. WEATHERSBY and WILLIE B. CLARK, citizens of the United States, and residents of Mammoth, in the county of Pinal and State of Arizona, have invented certain new and useful Improvements in Belt-Guiding Devices, of which the following is a specification.

Our present invention relates to an attachment for vehicles, particularly driven vehicles, and is in the nature of an improved belt guiding device forming part of a belt traction device for use in sections of the country where loose, sandy soil is predominant and the vehicles retarded as a consequence thereof.

In the accompanying drawings which illustrate our invention Figure 1 is a side elevation of a vehicle illustrating the practical application of our invention. Fig. 2 is a plan view thereof. Fig. 3 is a perspective view of one of the roller mounted brackets. Fig. 4 is a detail view of a portion of one of the brackets, partly broken away and in section.

Referring now to these figures, A indicates the frame of a vehicle having forward and rear axles $a$ and $a'$ upon which are supported the wheels $a^2$ and $a^3$, the wheels $a^2$ being arranged one upon one side of the body and frame A and the wheels $a^3$ being arranged upon the opposite side thereof.

In accordance with the invention, we provide brackets B, one of which is secured to a stationary portion of the frame or axle adjacent each of the wheels and which is shown in detail in Figs. 3 and 4. Each of these brackets B includes a tubular attaching portion $b$ and upright and horizontal arms $b'$ and $b^2$ respectively. Each of the arms $b'$ and $b^2$ is provided with a U-shaped outer end upon the extensions $b^3$ of which are mounted rollers $b^4$, these rollers being freely rotatable by means of the anti-friction bearings $b^5$ and being provided with conical lower ends arranged in contact with the conical opposite ends of a horizontal roller $b^6$ mounted with anti-friction bearings upon a transverse support $b^7$ secured between the extensions $b^3$. The extremity of one extension $b^3$ is provided with a hook $b^8$. The opposite extension is provided at its extremity with a latch $b^9$, a plate $b^{10}$ being provided with an aperture at one end engaged by the hook $b^8$ and an aperture at its opposite end adapted to be engaged by the latch $b^9$. In operative position as particularly seen in Figs. 1 and 2, each of the brackets B is secured so that its arm $b'$ extends vertically above the respective vehicle wheel and its arm $b^2$ extends horizontally beyond the outer side of the wheel, that is forwardly of the wheel if it is one of the forward wheels and rearwardly of the wheel if it is one of the rear wheels.

Over the several horizontal rollers $b^6$ there is disposed a relatively broad and substantially flat traction belt C which thus extends between and over the front and rear wheels upon opposite sides of the vehicle, substantially as illustrated in Figs. 1 and 2 and which is thereby movably supported in order that it may travel with the rotation of the wheels and at the same time provide a greatly enlarged traction surface for the vehicle and prevent the wheels from sinking in loose sandy soil. This belt which is of slightly greater width than the vehicle wheels themselves is confined between the vertical rollers $b^4$ of the several brackets B and is confined and prevented from accidental displacement by means of the latch plates $b^{10}$.

The traction belt itself is susceptible of manufacture in many different forms and from various materials, it being important, however, that it shall be of substantial breadth and comparatively flat in order that it may perform the function set forth.

We claim:

1. In a device of the character described, belt tightening means comprising a bracket having vertical and horizontal arms, each of which arms is provided with U-shaped outer extensions, a roller journaled horizontally between the extensions of each arm and rollers journaled vertically on the extensions and at the opposite ends of the horizontal roller and forming therebetween a belt receiving guide space, said horizontal and vertical rollers having relatively engaging conical ends, all substantially as and for the purpose set forth.

2. In a device of the character described, belt tightening means comprising a bracket having vertical and horizontal arms, each of which arms is provided with U-shaped outer extensions, a roller journaled horizontally between the extensions of each arm and rollers journaled vertically on the extensions and at the opposite ends of the horizontal rollers and forming therebetween a belt receiving guide space, and a latch member engageable with the said extensions at the outer ends of the vertical rollers to close the said guide space in use, said horizontal and vertical rollers having relatively engaging conical ends, all substantially as and for the purpose set forth.

ROBERT H. WEATHERSBY.
WILLIE B. CLARK.

Witnesses:
GEO. F. JEWELL,
C. S. CHRISMAN.

Copies of this patent may be obtained for five cents each, by addressing the "Commissioner of Patents, Washington, D. C."